(12) United States Patent
Wakayama et al.

(10) Patent No.: US 12,459,136 B2
(45) Date of Patent: Nov. 4, 2025

(54) ROBOT HAND

(71) Applicant: Panasonic Intellectual Property Management Co., Ltd., Osaka (JP)

(72) Inventors: Tatsuhiro Wakayama, Osaka (JP); Takayuki Uchida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 843 days.

(21) Appl. No.: 17/663,443

(22) Filed: May 16, 2022

(65) Prior Publication Data

US 2022/0371207 A1 Nov. 24, 2022

(30) Foreign Application Priority Data

May 24, 2021 (JP) .................. 2021-086813

(51) Int. Cl.
*B25J 15/08* (2006.01)
*B25J 9/10* (2006.01)

(52) U.S. Cl.
CPC ............... *B25J 15/08* (2013.01); *B25J 9/10* (2013.01)

(58) Field of Classification Search
CPC .... B25J 15/0206; B25J 15/0293; B25J 15/08; B25J 9/0009; B25J 9/10; B25J 9/1612; G05B 2219/39409; G05B 2219/39487
See application file for complete search history.

(56) References Cited

FOREIGN PATENT DOCUMENTS

| JP | 2011-240422 | 12/2011 |
| JP | 2014-161959 | 9/2014 |
| JP | 2015-217447 | 12/2015 |

*Primary Examiner* — William E Dondero
(74) *Attorney, Agent, or Firm* — Wenderoth, Lind & Ponack, L.L.P.

(57) ABSTRACT

A robot hand includes a first proximal end finger having a first protrusion at a distal end of the first proximal end finger, a first distal end finger that is connected to the first proximal end finger in a relatively rotatable manner and has a first cutout allowable the first protrusion to pass, a second proximal end finger having a second protrusion at a distal end of the second proximal end finger, a second distal end finger that is connected to the second proximal end finger in a relatively rotatable manner and has a second cutout allowable the second protrusion to pass, an opening and closing drive unit that relatively moves the second proximal end finger with respect to the first proximal end finger, a first rotation drive unit that relatively rotates the first distal end finger with respect to the first proximal end finger, a second rotation drive unit that relatively rotates the second distal end finger with respect to the second proximal end finger, and a controller that actuates the opening and closing drive unit, the first rotation drive unit, and the second rotation drive unit.

5 Claims, 10 Drawing Sheets

ROBOT HAND

BACKGROUND

1. Technical Field

The present disclosure relates to a robot hand.

2. Description of the Related Art

The recent progress of robot technology has resulted in automation using a robot system at manufacturing sites of industrial products. PTL 1 discloses an example of a robot hand constituting a robot system. The robot hand selectively uses a plurality of fingers in accordance with the shape, size, and weight of an object.

CITATION LIST

Patent Literature

PTL 1: Unexamined Japanese Patent Publication No. 2011-240422

SUMMARY

A robot hand according to one aspect of the present disclosure includes a first proximal end finger having a first protrusion at a distal end of the first proximal end finger, a first distal end finger that is connected to the first proximal end finger in a relatively rotatable manner and has a first cutout allowable the first protrusion to pass, a second proximal end finger having a second protrusion at a distal end of the second proximal end finger, a second distal end finger that is connected to the second proximal end finger in a relatively rotatable manner and has a second cutout allowable the second protrusion to pass, an opening and closing drive unit that relatively moves the second proximal end finger with respect to the first proximal end finger, a first rotation drive unit that relatively rotates the first distal end finger with respect to the first proximal end finger, a second rotation drive unit that relatively rotates the second distal end finger with respect to the second proximal end finger, and a controller that activates the opening and closing drive unit, the first rotation drive unit, and the second rotation drive unit.

DETAILED DESCRIPTIONS

One robot hand is required to perform various types of work. An object of the present disclosure is to provide a robot hand that is capable of performing various types of work.

An exemplary embodiment of the present disclosure will hereinafter be described with reference to the drawings.

Figure 1:
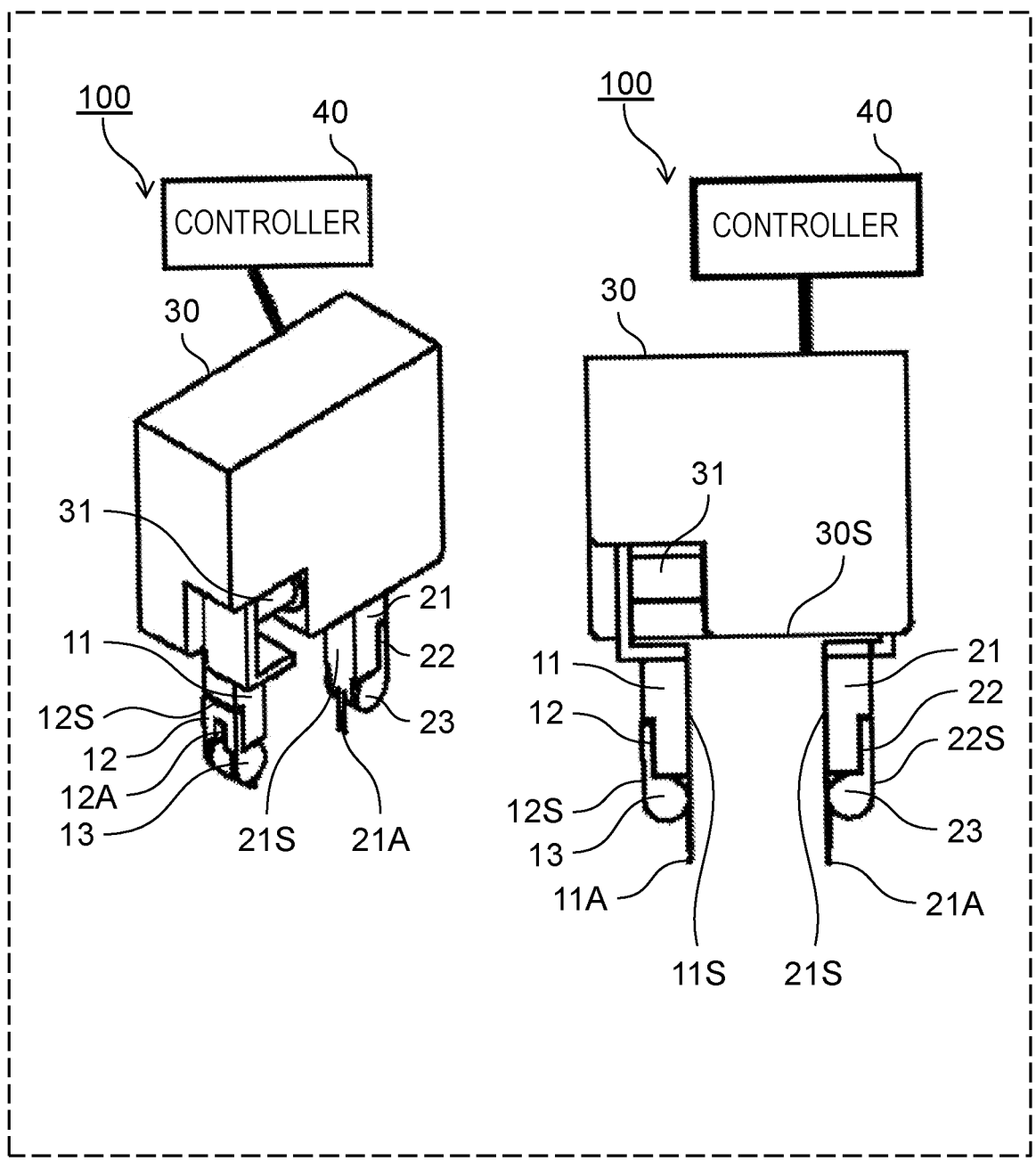
FIG. 1 is a perspective view and a front view of a robot hand in a first state.

FIG. 1 is a perspective view and a front view of robot hand 100 according to an exemplary embodiment of the present disclosure. A left diagram of FIG. 1 is the perspective view of robot hand 100 in a first state, and a right diagram of FIG. 1 is the front view of robot hand 100 in the first state.

Robot hand 100 includes first proximal end finger 11, first distal end finger 12, first rotation drive unit 13, second proximal end finger 21, second distal end finger 22, second rotation drive unit 23, hand portion 30, opening and closing drive unit 31, and controller 40.

First proximal end finger 11 is attached to hand portion 30 via opening and closing drive unit 31 including a motor, a shaft, and the like.

First distal end finger 12 is attached to a distal end side of first proximal end finger 11 rotatably with respect to first proximal end finger 11. One finger is constituted by first proximal end finger 11 and first distal end finger 12, and first rotation drive unit 13 constituted by a motor or the like is disposed in the finger. When first rotation drive unit 13 is actuated, first distal end finger 12 rotates relatively with respect to first proximal end finger 11. A rotation center axis of the rotation operation of first distal end finger 12 performed by first rotation drive unit 13 is parallel to first proximal end finger pad 11S, described later.

First proximal end finger 11 has first protrusion 11A on the distal end side of first proximal end finger 11. First distal end finger 12 has first cutout 12A at an end portion on a side connected to first proximal end finger 11. First cutout 12A has a size such that the first protrusion 11A can pass therethrough when first distal end finger 12 rotates relatively to first proximal end finger 11. That is, the width of first protrusion 11A is smaller than the width of first distal end finger 12 (that is, the width of first distal end finger pad 12S, described later).

Second proximal end finger 21 is fixed to hand portion 30.

Second distal end finger 22 is attached to a distal end side of second proximal end finger 21 rotatably with respect to second proximal end finger 21. One finger is constituted by second proximal end finger 21 and second distal end finger 22, and second rotation drive unit 23 constituted by a motor or the like is disposed in the finger. When second rotation drive unit 23 is actuated, second distal end finger 22 rotates relatively with respect to second proximal end finger 21. A rotation center axis of the rotation operation of second distal end finger 22 performed by second rotation drive unit 23 is parallel to the rotation center axis of the rotation operation of first distal end finger 12 performed by first rotation drive unit 13.

Second proximal end finger 21 has second protrusion 21A on the distal end side of second proximal end finger 21. Second distal end finger 22 has second cutout 22A at an end portion on a side connected to second proximal end finger 21. Second cutout 22A has a size such that second protrusion 21A can pass therethrough when second distal end finger 22 rotates relatively to second proximal end finger 21. That is, the width of second protrusion 21A is smaller than the width of second distal end finger 22 (that is, the width of second distal end finger pad 22S, described later).

When opening and closing drive unit 31 is actuated, the finger constituted by first proximal end finger 11 and first distal end finger 12 moves relatively to hand portion 30, and furthermore, relatively to the finger constituted by second proximal end finger 21 and second distal end finger 22.

First proximal end finger 11 has first proximal end finger pad 11S on a side facing second proximal end finger 21. In the present exemplary embodiment, first proximal end finger pad 11S has a flat surface. Second proximal end finger 21 has second proximal end finger pad 21S on a side facing first proximal end finger 11. In the present exemplary embodiment, second proximal end finger pad 21S has a flat surface parallel to first proximal end finger pad 11S. Opening and closing drive unit 31 relatively moves first proximal end finger 11 with respect to second proximal end finger 21 in a direction orthogonal to first proximal end finger pad 11S while first proximal end finger pad 11S is kept parallel to second proximal end finger pad 21S. Note that the shapes of first proximal end finger pad 11S and second proximal end finger pad 21S can be appropriately changed in accordance with an object to be gripped, and are not necessarily flat.

First distal end finger 12 has first distal end finger pad 12S which is a flat surface. Second distal end finger 22 has second distal end finger pad 22S that is a flat surface. In the state illustrated in FIG. 1, first distal end finger pad 12S and second distal end finger pad 22S face the outside of robot hand 100. In this state, first protrusion 11A disposed on the distal end side of first proximal end finger 11 is located at the distal end of one finger constituted by first proximal end finger 11 and first distal end finger 12. Further, second protrusion 21A disposed on the distal end side of second proximal end finger 21 is located at the distal end of one finger constituted by second proximal end finger 21 and second distal end finger 22. Note that the shapes of first distal end finger pad 12S and second distal end finger pad 22S can be appropriately changed in accordance with an object to be gripped, and are not necessarily flat.

Controller 40 is, for example, a central processing unit (CPU), and controls the operation of robot hand 100 by controlling first rotation drive unit 13, second rotation drive unit 23, and opening and closing drive unit 31.

Figure 2:
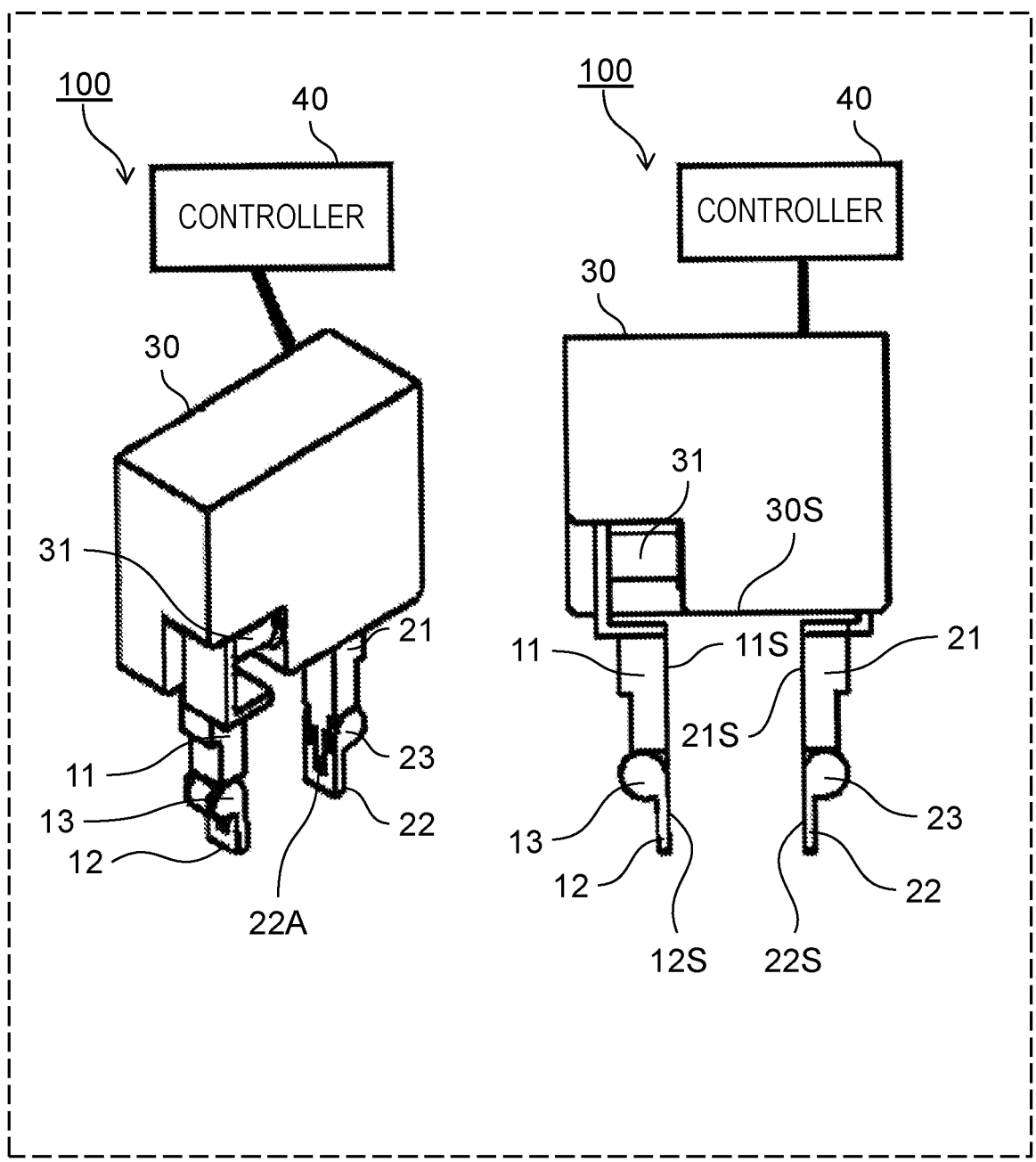
FIG. 2 is a perspective view and a front view of the robot hand in a second state.

FIG. 2 is a perspective view and a front view of robot hand 100 according to the exemplary embodiment of the present disclosure in a state different from the state illustrated in FIG. 1. A left diagram of FIG. 2 is the perspective view of robot hand 100 in a second state, and a right diagram of FIG. 2 is the front view of robot hand 100 in the second state.

The state illustrated in FIG. 2 is a state in which first distal end finger 12 and second distal end finger 22 are arranged to extend linearly towards the distal end sides of first proximal end finger 11 and second proximal end finger 21 respectively by the operation of first rotation drive unit 13 and second rotation drive unit 23. In this state, first distal end finger pad 12S is flush with first proximal end finger pad 11S. Second distal end finger pad 22S is flush with second proximal end finger pad 21S. In this state, first protrusion 11A is located in first cutout 12A, and second protrusion 21A is located in second cutout 22A.

Figure 3:
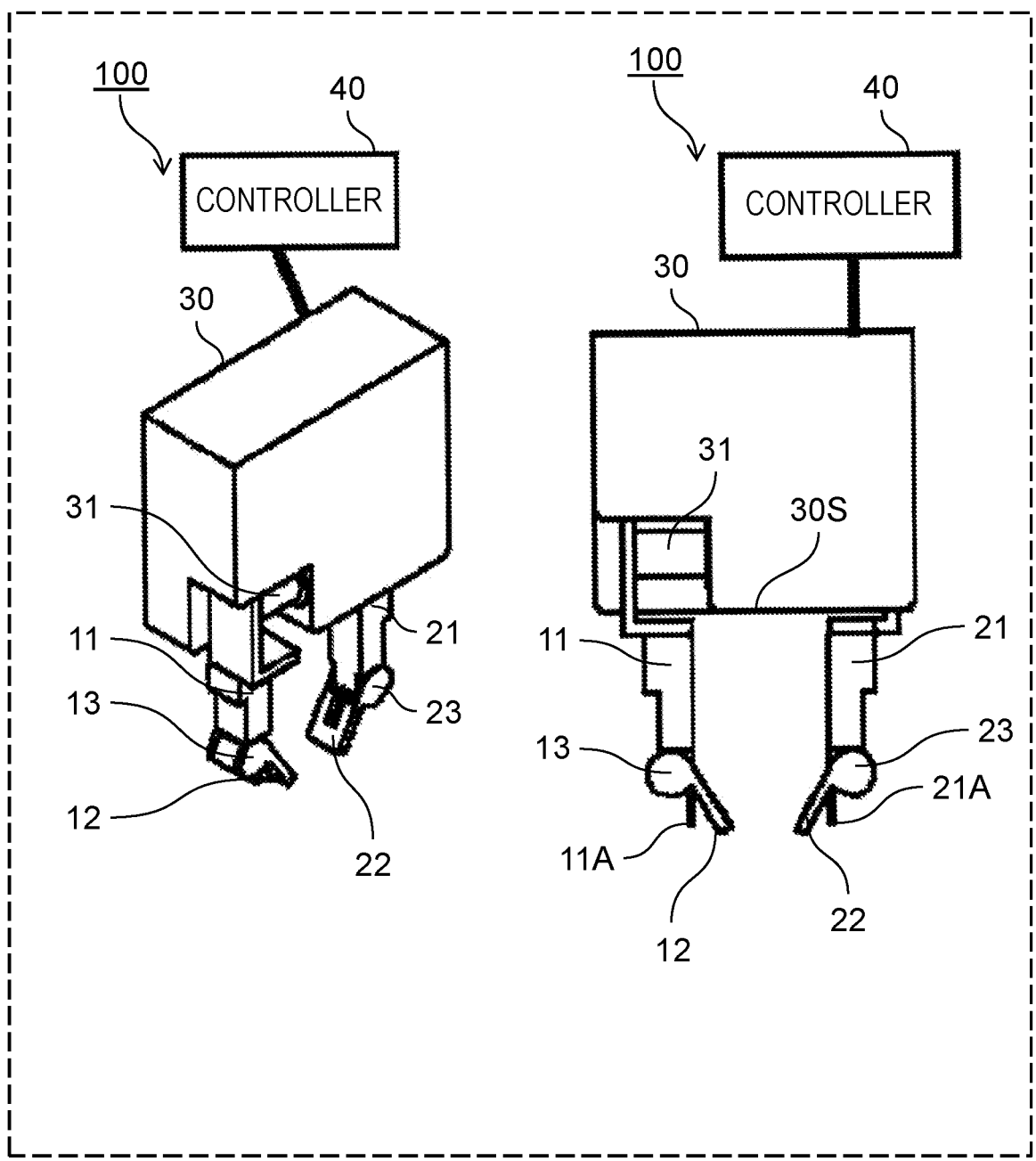
FIG. 3 is a perspective view and a front view of the robot hand in a third state.

FIG. 3 is a perspective view and a front view of robot hand 100 according to the exemplary embodiment of the present disclosure in a state different from the states illustrated in FIGS. 1 and 2. A left diagram of FIG. 3 is the perspective view of robot hand 100 in a third state, and a right diagram of FIG. 3 is the front view of robot hand 100 in the third state.

The state illustrated in FIG. 3 is a state in which first distal end finger 12 and second distal end finger 22 are disposed to extend towards the distal end sides of first proximal end finger 11 and second proximal end finger 21 in a bent manner respectively by the operations of first rotation drive unit 13 and second rotation drive unit 23. In this state, first distal end finger pad 12S crosses first proximal end finger pad 11S. Second distal end finger pad 22S crosses second proximal end finger pad 21S. In this state, first distal end finger 12 and second distal end finger 22 are located between first proximal end finger pad 11S and second proximal end finger pad 21S.

Robot hand 100 configured as described above can operate as described below.

Figure 4:
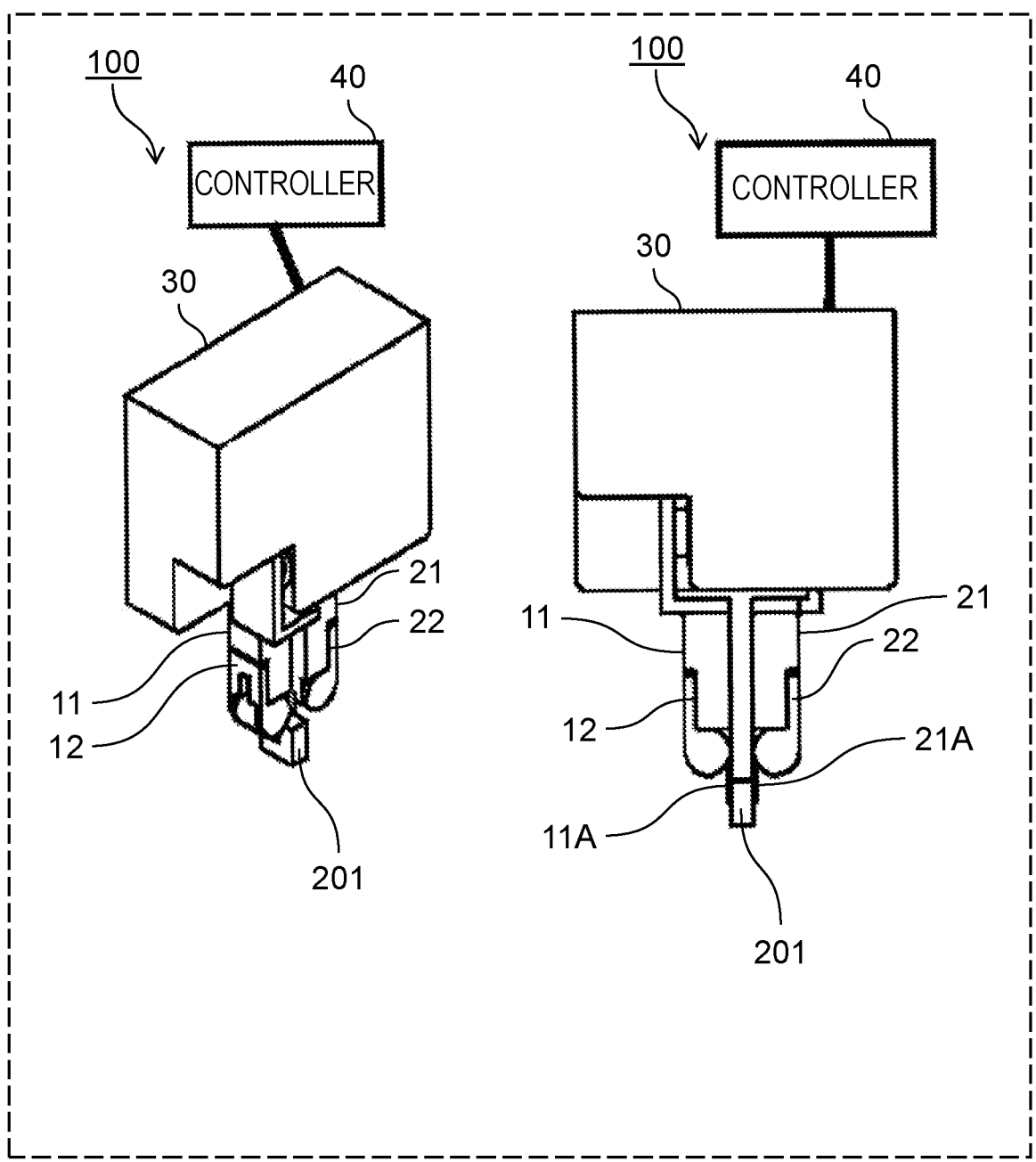
FIG. 4 is a perspective view and a front view of the robot hand gripping an object.

FIG. 4 is a perspective view and a front view of robot hand 100 in a state in which robot hand 100 is gripping object 201 when robot hand 100 is in the state illustrated in FIG. 1. A left diagram of FIG. 4 is the perspective view of robot hand 100, and a right diagram of FIG. 4 is the front view of robot hand 100.

When robot hand 100 is brought into the state illustrated in FIG. 4, robot hand 100 can precisely grip object 201 that is comparatively small and move or work in a small space while gripping object 201. At this time, the state of robot hand 100 is as follows. That is, a back surface of first proximal end finger 11 and a back surface of first distal end finger 12 are in contact with each other, and a back surface of second proximal end finger 21 and a back surface of second distal end finger 22 are in contact with each other. Thus, first protrusion 11A and second protrusion 21A protrude. Therefore, by operating opening and closing drive unit 31, object 201 can be gripped between first protrusion 11A (that is, first proximal end finger pad 11S) and second protrusion 21A (that is, second proximal end finger pad 21S).

Figure 5:
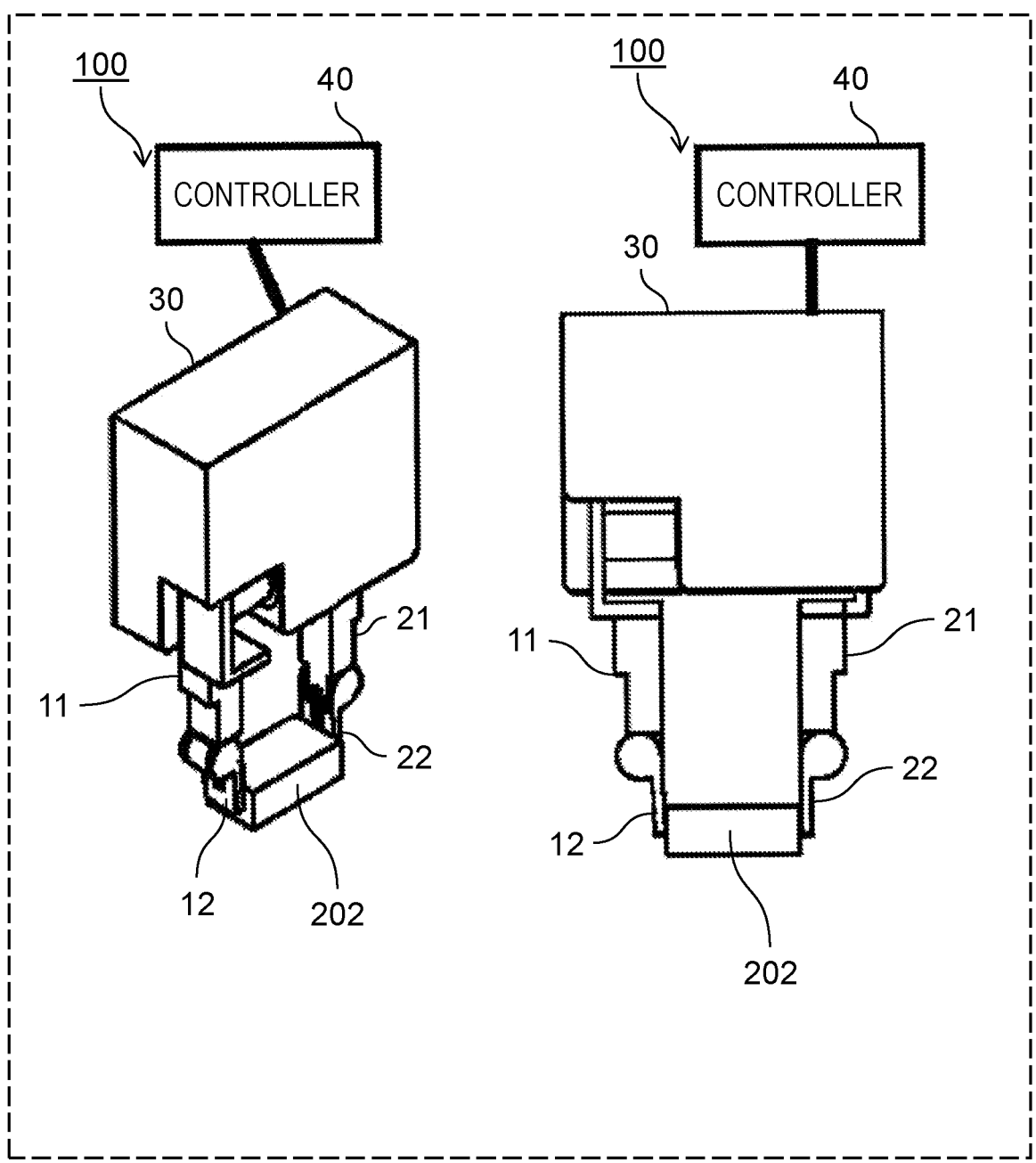
FIG. 5 is a perspective view and a front view of the robot hand gripping an object.

FIG. 5 is a perspective view and a front view of robot hand 100 in a state in which robot hand 100 is gripping object 202 when robot hand 100 is in the state illustrated in FIG. 2. A left diagram of FIG. 5 is the perspective view of robot hand 100, and a right diagram of FIG. 5 is the front view of robot hand 100.

When robot hand 100 is brought into the state shown in FIG. 5, comparatively large object 202 can be stably gripped. At this time, the state of robot hand 100 is as follows. That is, first distal end finger 12 wider than first protrusion 11A is located closer to the distal end side of first proximal end finger 11 than first protrusion 11A is, and second distal end finger 22 wider than second protrusion 21A is located closer to the distal end side of second proximal end finger 21 than second protrusion 21A is. Therefore, by operating the opening and closing drive unit 31, a comparatively large part of object 202 can be stably gripped between first distal end finger 12 (that is, first distal end finger pad 12S) and second distal end finger 22 (that is, second distal end finger pad 22S) each having a wide area. In addition, depending on a size and a shape of an object, a comparatively larger part of the object can be more stably gripped between first distal end finger 12 and first proximal end finger 11 (that is, first distal end finger pad 12S and first proximal end finger pad 11S), and second distal end finger 22 and second proximal end finger 21 (that is, second distal end finger pad 22S and second proximal end finger pad 21S).

Figure 6:
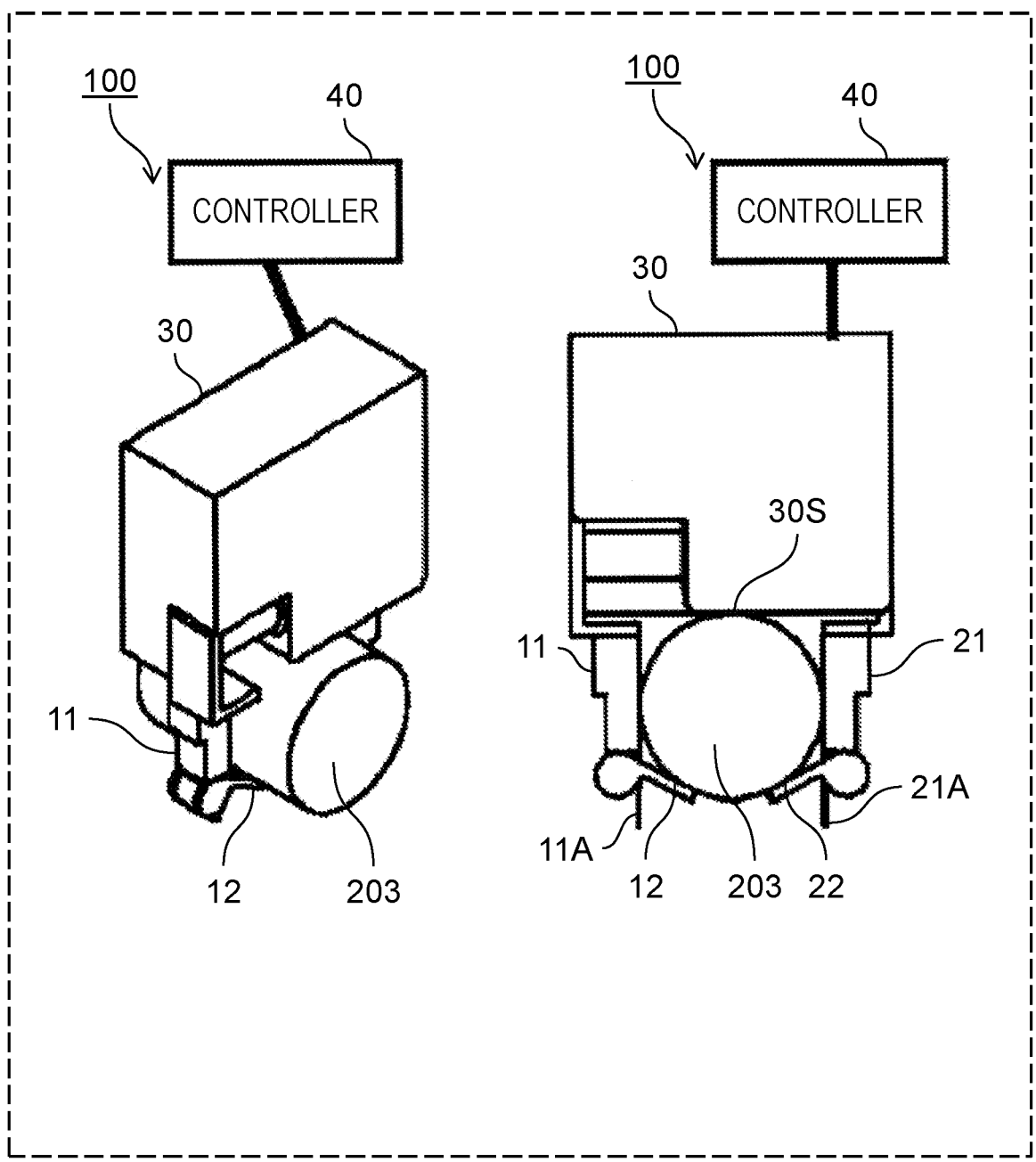
FIG. 6 is a perspective view and a front view of the robot hand gripping an object.

FIG. 6 is a perspective view and a front view of robot hand 100 in a state in which robot hand 100 is gripping object 203 when robot hand 100 is in the state illustrated in FIG. 3. A left diagram of FIG. 6 is the perspective view of robot hand 100, and a right diagram of FIG. 6 is the front view of robot hand 100.

When robot hand 100 is brought into the state illustrated in FIG. 6, object 203 that is comparatively difficult to be gripped because of a complicated shape or heavy weight can be stably gripped between two planes. At this time, the state of robot hand 100 is as follows. That is, first distal end finger 12 and second distal end finger 22 are located between first proximal end finger pad 11S and second proximal end finger pad 21S. Therefore, when opening and closing drive unit 31 is actuated, object 203 can be gripped between first proximal end finger 11 and second proximal end finger 21, and thus first distal end finger 12 and second distal end finger 22 can be located below object 203. That is, object 203 can be supported from below by first distal end finger 12 and second distal end finger 22. Therefore, object 203 that is comparatively difficult to be gripped can be stably gripped by being sandwiched between the two planes. In addition, as illustrated in FIG. 6, object 203 that is comparatively large is brought into contact with first proximal end finger pad 11S, first distal end finger pad 12S, second proximal end finger pad 21S, second distal end finger pad 22S, and palm surface 30S (pressed against palm surface 30S to be gripped), and thus object 203 can be gripped more stably.

As described above, robot hand 100 according to the present exemplary embodiment can switch between a combination of first protrusion 11A and second protrusion 21A and a combination of first distal end finger 12 and second distal end finger 22. Therefore, various objects can be gripped by switching the combinations in accordance with objects to be gripped and work environments.

Further, first distal end finger 12 and second distal end finger 22 can perform not only the operation for gripping an object but also an operation for pressing an object gripped by first protrusion 11A and second protrusion 21A against another object. By performing this operation, an operation such as the seal sticking operation can be performed. Hereinafter, an operation for sticking a seal, which is an object, to a sticking surface, which is another object, will be taken as an example, and an operation performed while pressing an object against another object will be described with reference to FIGS. 7 to 14.

Figure 12:
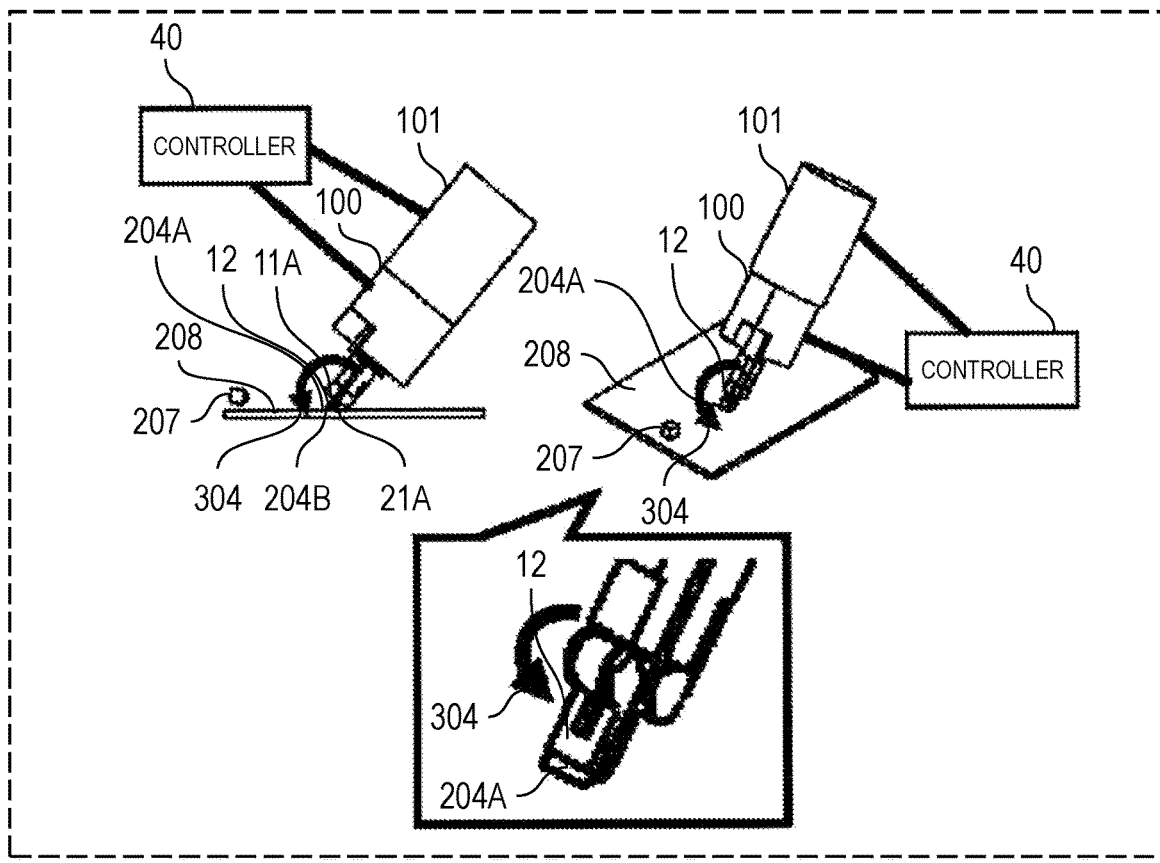
FIG. 12 is a side view and a perspective view of the periphery of the robot hand for describing the operation for sticking a seal.
Figure 13:
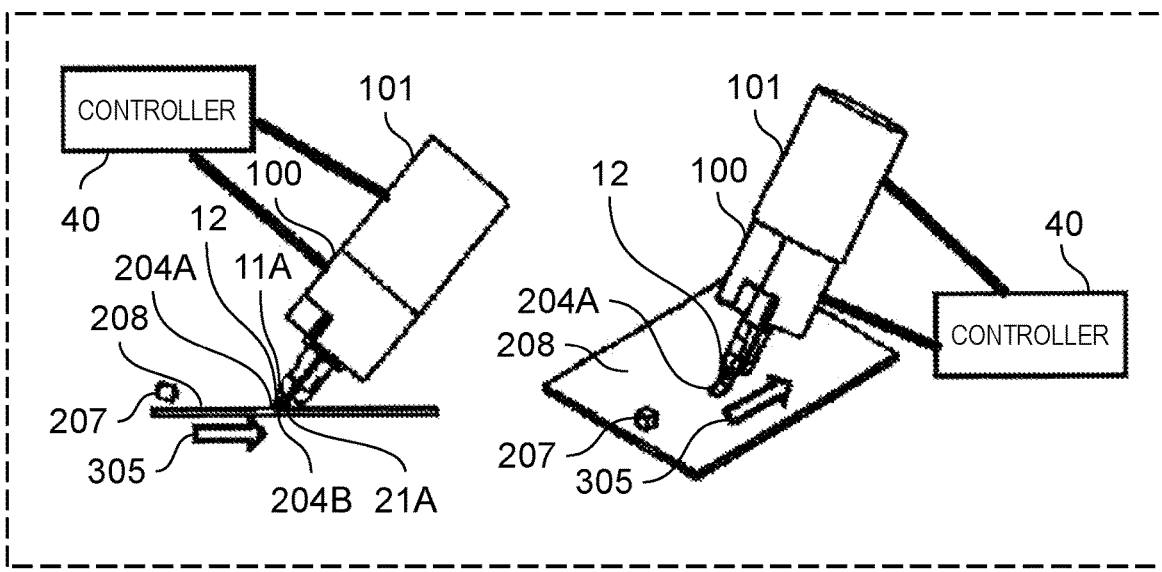
FIG. 13 is a side view and a perspective view of the periphery of the robot hand for describing the operation for sticking a seal.
Figure 14:
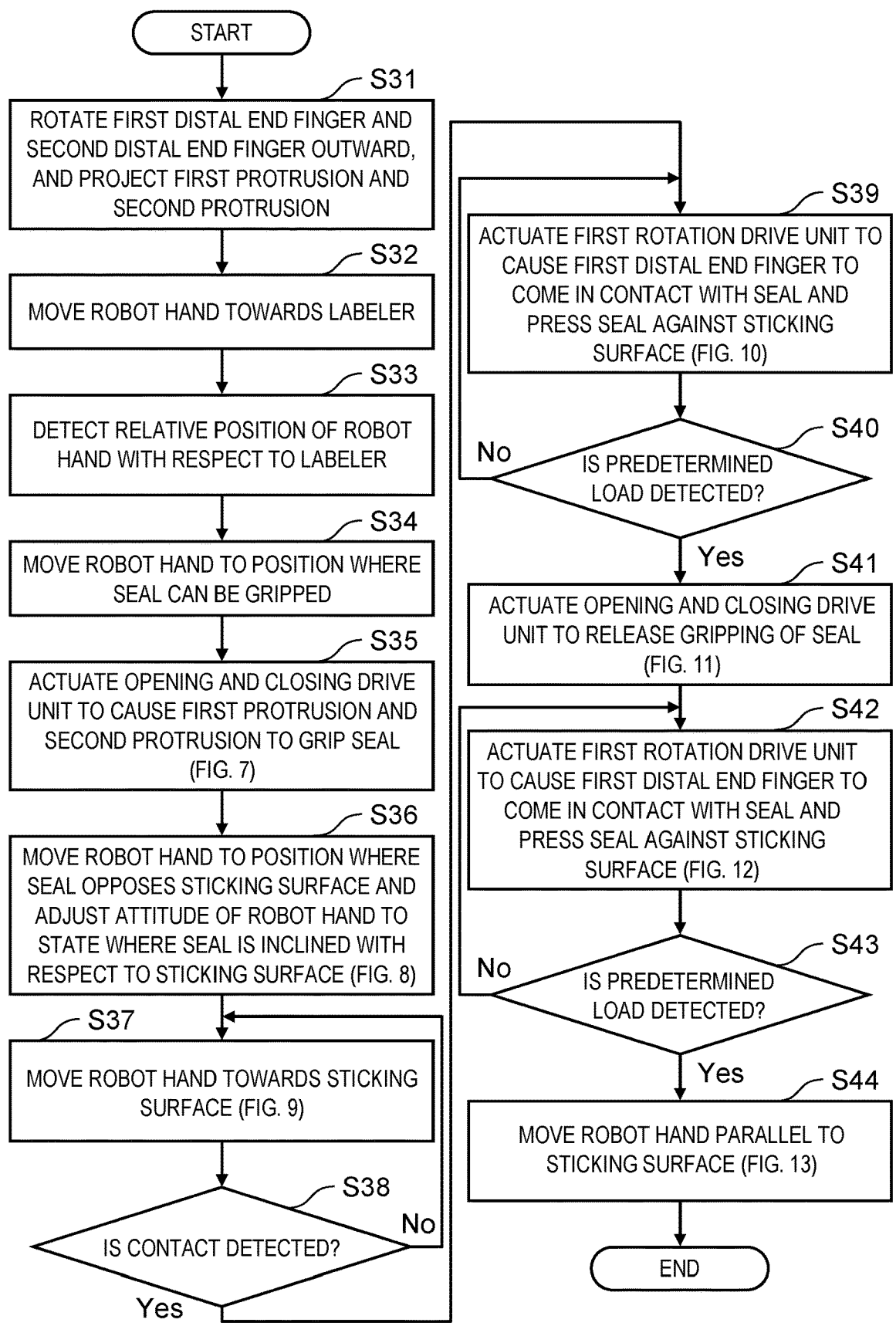
FIG. 14 is a flowchart for describing the operation for sticking a seal performed by the robot hand and a robot arm.

FIGS. 7 to 13 each are a side view and a perspective view of the periphery of robot hand 100 for describing the operation for sticking a seal. In each drawing, a left diagram is the side view of the periphery of robot hand 100, and a right diagram is the perspective view of the periphery of robot hand 100. As illustrated in FIGS. 7 to 13, robot hand 100 is attached to the distal end of robot arm 101 when the seal sticking operation is performed. FIG. 14 is an operation flow of robot hand 100 and robot arm 101, and illustrates a control algorithm performed by controller 40. That is, controller 40 controls robot arm 101 in addition to robot hand 100.

First, first rotation drive unit 13 is actuated so that the back surface of first distal end finger 12 (the surface across first distal end finger 12 from first distal end finger pad 12S) comes in contact with the back surface of first proximal end finger 11 (the surface across first proximal end finger 11 from first proximal end finger pad 11S). Further, second rotation drive unit 23 is actuated so that the back surface of second distal end finger 12 (the surface across second distal end finger 22 from second distal end finger pad 22S) comes in contact with the back surface of second proximal end finger 21 (the surface across second proximal end finger 21 from second proximal end finger pad 21S). That is, first distal end finger 12 and second distal end finger 22 are rotated outward, and first protrusion 11A and second protrusion 21A are caused to protrude toward the distal end side (S31 in FIG. 14).

Next, when robot arm 101 is moved, robot hand 100 is moved so that the distal end of robot hand 100 is positioned near labeler 205 that supplies seal 204 as an object to be gripped and stuck (S32).

For example, camera 206 disposed near labeler 205 images seal 204 and robot hand 100, and performs image analysis to detect a relative position of robot hand 100 with respect to labeler 205 (S33).

Then, robot hand 100 is moved to be capable of gripping seal 204 can be gripped by moving robot arm 101 (S34).

Figure 7:
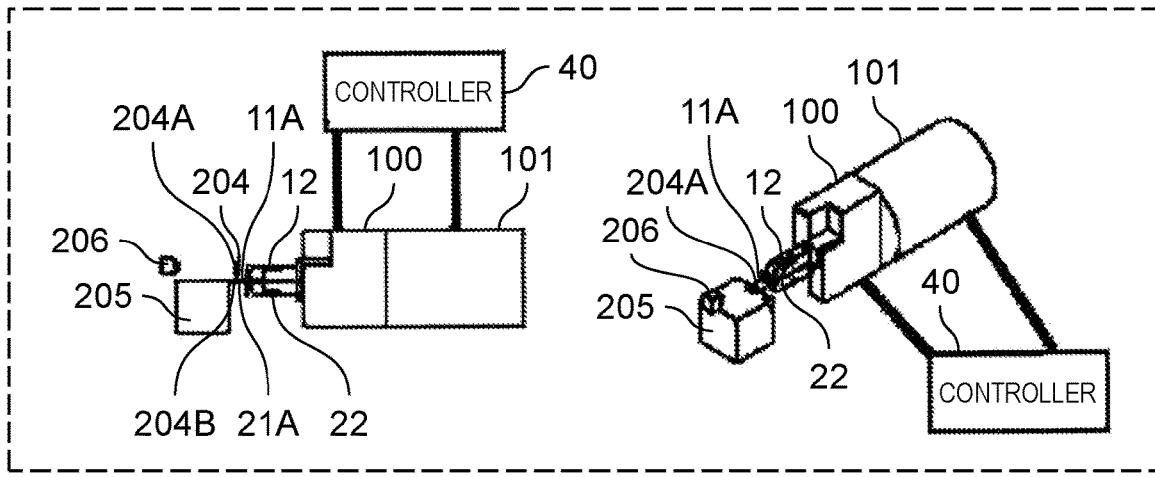
FIG. 7 is a side view and a perspective view of a periphery of the robot hand for describing an operation for sticking a seal.

Next, opening and closing drive unit 31 is actuated to cause first protrusion 11A and second protrusion 21A to grip seal 204 (S35). A state in which seal 204 is gripped is illustrated in FIG. 7. At this time, robot hand 100 grips seal 204 so that non-adhesive surface 204A of seal 204 comes in contact with first protrusion 11A and adhesive surface 204B comes in contact with second protrusion 21A.

Figure 8:
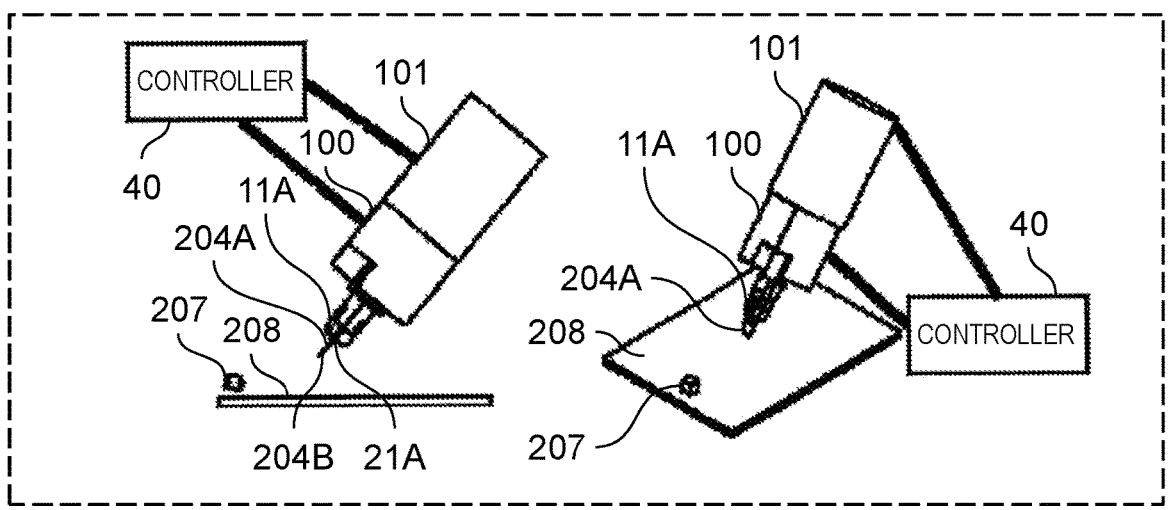
FIG. 8 is a side view and a perspective view of the periphery of the robot hand for describing the operation for sticking a seal.

Then, robot hand 100 is moved by moving robot arm 101 so that seal 204 faces sticking surface 208 to which seal 204 is stuck, and an attitude of robot hand 100 is adjusted so that seal 204 is inclined with respect to sticking surface 208 (S36). At this time, as illustrated in FIG. 8, adhesive surface 204B faces sticking surface 208, and robot hand 100 takes an oblique attitude with respect to sticking surface 208.

Figure 9:
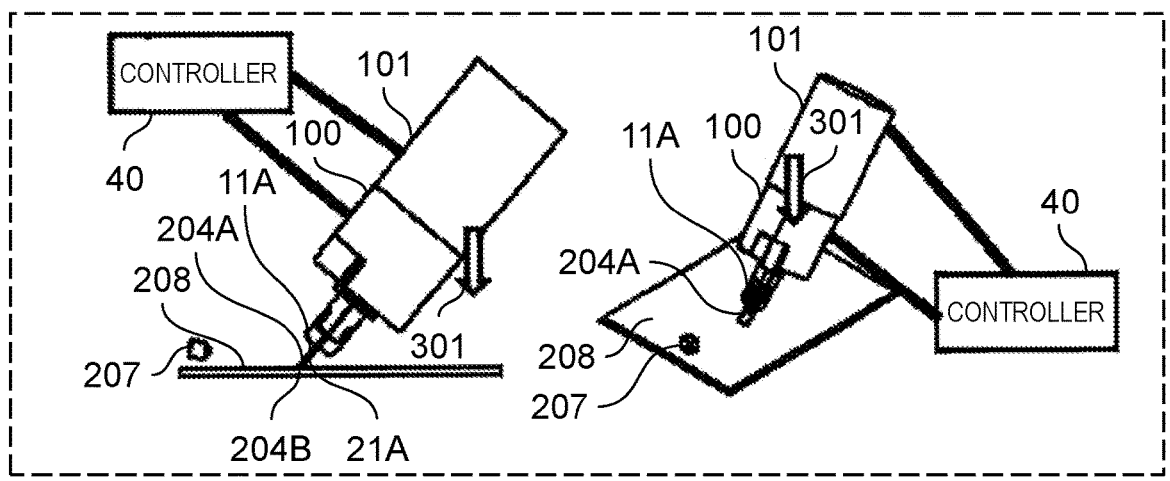
FIG. 9 is a side view and a perspective view of the periphery of the robot hand for describing the operation for sticking a seal.

In this state, robot hand 100 is then moved towards sticking surface 208 by moving robot arm 101 (S37). At this time, as illustrated in FIG. 9, robot arm 101 is moved in the direction perpendicular to sticking surface 208 until the distal end of seal 204 comes in contact with sticking surface 208. Arrow 301 in FIG. 9 indicates the movement of robot hand 100.

At this time, for example, camera 207 disposed near sticking surface 208 images seal 204 and sticking surface 208, and performs image analysis to detect contact of seal 204 with sticking surface 208 (S38). When the contact is not detected (No in S38), robot hand 100 is continuously moved towards sticking surface 208 (S37).

Figure 10:
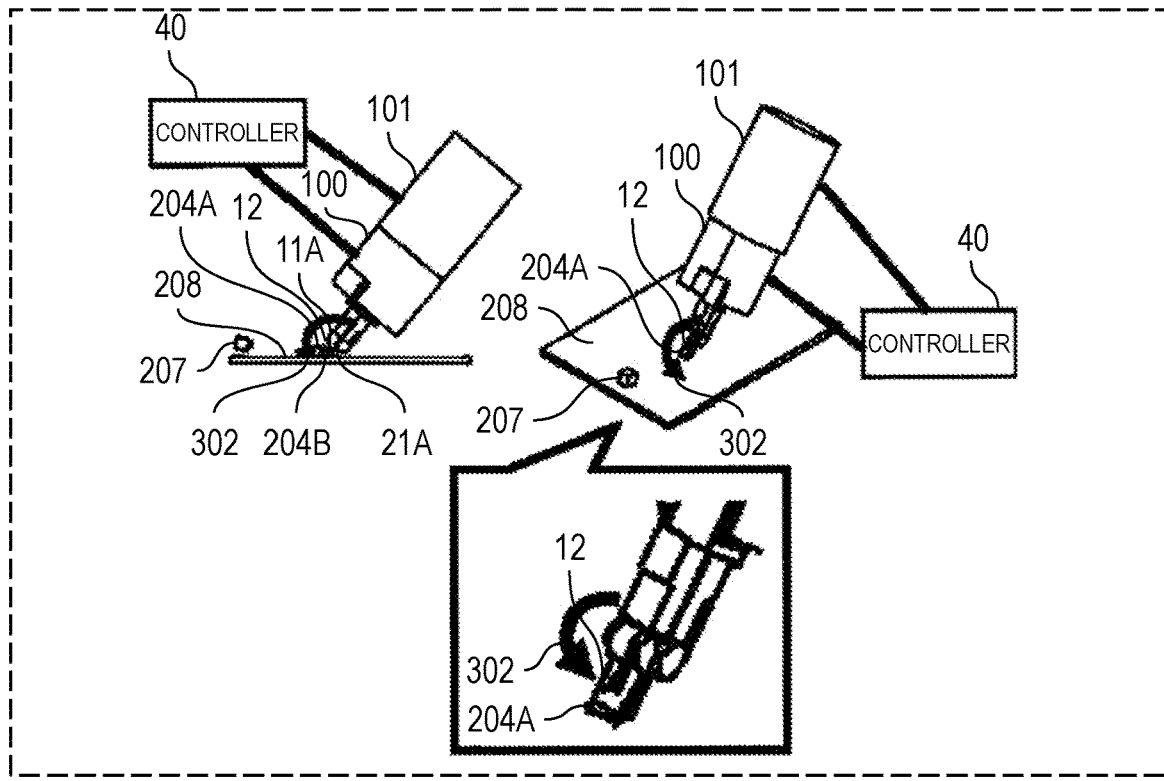
FIG. 10 is a side view and a perspective view of the periphery of the robot hand for describing the operation for sticking a seal.

When the contact is detected (Yes in S38), first rotation drive unit 13 is actuated to move first distal end finger 12 to the distal end side of first proximal end finger 11, thereby bringing first distal end finger 12 into contact with seal 204 and pressing seal 204 against sticking surface 208 (S39). The state at this time is illustrated in FIG. 10. Arrow 302 in FIG. 10 indicates the movement of first distal end finger 12.

A pressing amount (pressing force) at a time when seal 204 is pressed against sticking surface 208 is obtained by calculating a load based on a current value of a motor included in first rotation drive unit 13 (S40). Note that the load may be obtained based on a parameter other than the current value of the motor, such as a detection value of a pressure sensor.

When the predetermined load is not detected (No in S40), the operation of first rotation drive unit 13 and the pressing of seal 204 performed by first distal end finger 12 (S39) are continued.

Figure 11:
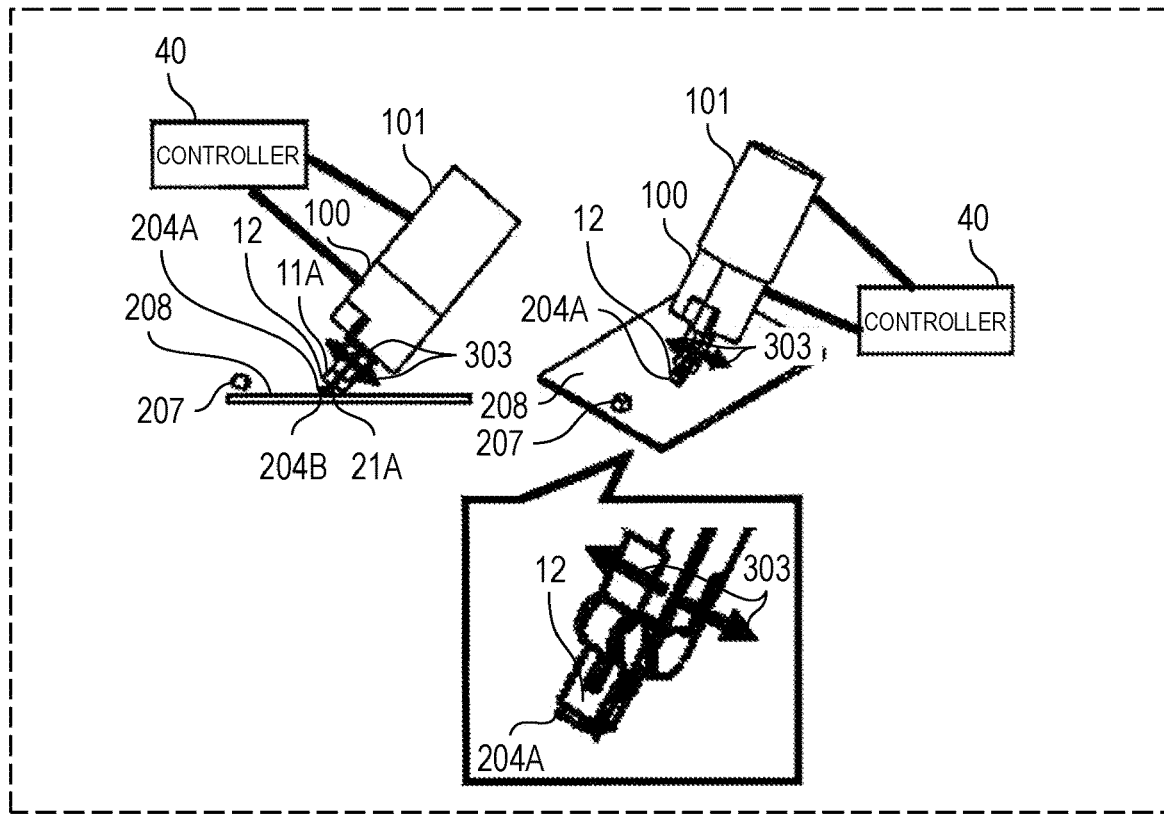
FIG. 11 is a side view and a perspective view of the periphery of the robot hand for describing the operation for sticking a seal.

When the predetermined load is detected (Yes in S40), first distal end finger 12 presses seal 204 against sticking surface 208 with an appropriate pressing amount (pressing force). At this time, by operating opening and closing drive unit 31, first proximal end finger 11 moves by a minute amount (a distance longer than or equal to a thickness of seal 204) so as to be separated from second proximal end finger 21, and the gripping of seal 204 by robot hand 100 is released (S41). The state at this time is illustrated in FIG. 11. Arrow 303 in FIG. 11 indicates a relative movement of first proximal end finger 11 and second proximal end finger 21 with respect to each other.

By moving first proximal end finger 11 to be separated from second proximal end finger 21, first distal end finger 12 may be separated from seal 204, or the force for pressing seal 204 against sticking surface 208 may be weakened. Therefore, when first rotation drive unit 13 is again actuated after first proximal end finger 11 is moved, first distal end finger 12 is caused to come contact with seal 204, and seal 204 is pressed against sticking surface 208 (S42). The state at this time is illustrated in FIG. 12. Arrow 304 in FIG. 12 indicates the movement of first distal end finger 12.

A pressing amount (pressing force) at a time when seal 204 is pressed against sticking surface 208 is obtained by calculating a load based on a current value of the motor included in first rotation drive unit 13 (S43).

When the predetermined load is not detected (No in S43), the operation of first rotation drive unit 13 and the pressing of seal 204 performed by first distal end finger 12 (S42) are continued.

When the predetermined load is detected (Yes in S43), first distal end finger 12 presses seal 204 against sticking surface 208 with an appropriate pressing amount (pressing force).

In this state, robot hand 100 is moved parallel to sticking surface 208 by moving robot arm 101 (S44). The state at this time is illustrated in FIG. 13. Arrow 305 in FIG. 13 indicates the movement of robot hand 100.

With the above flow, the work of sticking seal 204 to sticking surface 208 can be completed while first distal end finger 12 is being pressed against seal 204.

It is needless to say that the technical scope of the present disclosure is not limited to the above-described exemplary embodiment, and forms in which various modifications are made without departing from the gist of the present disclosure are also included in the technical scope of the present disclosure.

For example, controller 40 may actuate opening and closing drive unit 31 to actuate first rotation drive unit 13 with an object being sandwiched between first protrusion 11A and second protrusion 21A, thereby bringing first distal end finger pad 12S into contact with the object and causing first distal end finger 12 to press the object. With such an operation, when the object is, for example, a wire-shaped or thin-plate-shaped member, the object can be bent. Further, when an object is a member having plasticity, the object can be deformed and molded. Further, second distal end finger pad 22S may be brought into contact with the object by further operating second rotation drive unit 23. That is, first distal end finger 12 and second distal end finger 22 are brought into contact with the object sandwiched between first protrusion 11A and second protrusion 21A to apply a pressure to both the sides of the object. Thus, the object may be deformed and molded.

According to the present disclosure, a robot hand capable of performing various types of work can be provided.

The robot hand of the present disclosure is useful as a general-purpose robot hand in a robot system that automates a product assembly process in a factory because the robot hand can grip objects of various sizes and perform various operations such as the seal sticking operation.

What is claimed is:

1. A robot hand comprising:
   a first proximal end finger having a first protrusion at a distal end of the first proximal end finger;
   a first distal end finger connected to the first proximal end finger in a relatively rotatable manner, the first distal end finger having a first cutout allowing the first protrusion to pass;
   a second proximal end finger having a second protrusion at a distal end of the second proximal end finger;
   a second distal end finger connected to the second proximal end finger in a relatively rotatable manner, the second distal end finger having a second cutout allowing the second protrusion to pass;
   an opening and closing drive unit that relatively moves the second proximal end finger with respect to the first proximal end finger;
   a first rotation drive unit that relatively rotates the first distal end finger with respect to the first proximal end finger;
   a second rotation drive unit that relatively rotates the second distal end finger with respect to the second proximal end finger; and
   a controller that actuates the opening and closing drive unit, the first rotation drive unit, and the second rotation drive unit.

2. The robot hand according to claim 1, wherein
   the first proximal end finger has a first proximal end finger pad that is a plane facing the second proximal end finger,
   the second proximal end finger has a second proximal end finger pad that is a plane opposed to the first proximal end finger and is parallel to the first proximal end finger pad, and
   the opening and closing drive unit relatively moves the first proximal end finger with respect to the second proximal end finger in a direction orthogonal to the first proximal end finger pad while the first proximal end finger pad and the second proximal end finger pad are kept parallel to each other.

3. The robot hand according to claim 2, wherein
   the first distal end finger has a first distal end finger pad that is a plane flush with the first proximal end finger pad when the first protrusion is positioned in the first cutout, and
   the second distal end finger has a second distal end finger pad that is a plane flush with the second proximal end finger pad when the second protrusion is positioned in the second cutout.

4. The robot hand according to claim 3, wherein the controller actuates the opening and closing drive unit and accordingly actuates the first rotation drive unit with an object being sandwiched between the first protrusion and the second protrusion to cause the first distal end finger pad to come in contact with the object and cause the first distal end finger to press the object against another object.

5. The robot hand according to claim 3, wherein the controller actuates the opening and closing drive unit and accordingly actuates the first rotation drive unit with an object being sandwiched between the first protrusion and the second protrusion to cause the first distal end finger pad to come in contact with the object and cause the first distal end finger to press the object.

\* \* \* \* \*